United States Patent
Whitmer et al.

(10) Patent No.: US 11,325,691 B2
(45) Date of Patent: May 10, 2022

(54) JOINT ASSEMBLY HAVING SHIMMED BOSSES AND ASSOCIATED METHOD OF MAKING THE JOINT ASSEMBLY

(71) Applicant: The Boeing Company, Chicago, IL (US)

(72) Inventors: Brett D. Whitmer, Kenmore, WA (US); William H. Graham, Mukilteo, WA (US); Evelyne Van Ingelghem, Seattle, WA (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 16/783,725

(22) Filed: Feb. 6, 2020

(65) Prior Publication Data
US 2021/0245861 A1    Aug. 12, 2021

(51) Int. Cl.
*B64C 3/26* (2006.01)
*B64F 5/10* (2017.01)
*F16B 5/02* (2006.01)

(52) U.S. Cl.
CPC .................. *B64C 3/26* (2013.01); *B64F 5/10* (2017.01); *F16B 5/02* (2013.01)

(58) Field of Classification Search
CPC .. B64C 3/26; B64C 3/28; B64C 3/187; Y10T 29/49948
See application file for complete search history.

(56) References Cited

U.S. PATENT DOCUMENTS

| 2,801,061 | A | 7/1957 | Logan et al. |
| 7,150,594 | B2 * | 12/2006 | Keener ............... F16B 19/1054 411/34 |
| 2008/0164376 | A1 * | 7/2008 | Kato ........................ B64C 3/28 244/132 |

(Continued)

FOREIGN PATENT DOCUMENTS

| GB | 2527156 | 12/2015 |
| WO | 2010003549 A2 | 1/2010 |

OTHER PUBLICATIONS

Wang et al., Shimming design and optimal selection for non-uniform gaps in wing assembly, Assembly Automation, May 2017, pp. 1-17.

(Continued)

*Primary Examiner* — Jason L Vaughan
*Assistant Examiner* — Amanda Kreiling
(74) *Attorney, Agent, or Firm* — Kunzler Bean & Adamson

(57) ABSTRACT

An assembly that comprises a first part and a second part. The second part comprises a non-faying surface facing the base surface, a plurality of faying surfaces manifested at bosses that are shimmed if and as required, and a plurality of second through-holes. A width of each one of the plurality of bosses is equal to or greater than $2(r+T \tan \theta)$, where r is a maximum radial dimension of an outermost peripheral portion of a fastener in contact with the first part or the second part, T is the distance from the point of contact, between a fastener and the first part or the second part, and a faying surface of a corresponding boss, and $\theta$ is an angle between a central axis of the corresponding second through-hole and an outermost load vector initiating at the point of contact between the fastener and the first part or the second part.

22 Claims, 9 Drawing Sheets

(56) References Cited

U.S. PATENT DOCUMENTS

2009/0155063 A1* 6/2009 Duchatelle ............. B64D 27/26
415/198.1

OTHER PUBLICATIONS

Cheng et al., Experimental and numerical analyses of the shimming effect on bolted joints with nonuniform gaps, Journal of Mechanic Engineering Science, Oct. 2, 2018 pp. 1-12.
Dalin et al. Measurement of the Thickness of U-30MES-5NT and VGM-L Sealing Compound Layers in Aircraft Products Using the Ultrasonic Nondestructive Testing Method, Polymer Science vol. 5, No. 4, Feb. 20, 2012, pp. 305-308.
Extended European Search Report for EP Patent Application No. 21153375.7 dated Jun. 16, 2021.

\* cited by examiner

JOINT ASSEMBLY HAVING SHIMMED BOSSES AND ASSOCIATED METHOD OF MAKING THE JOINT ASSEMBLY

FIELD

This disclosure relates generally to the joining together of two or more parts to form an assembly, and more particularly to joint assemblies and a process for forming a joint assembly of an aircraft that reduces or eliminates shimming.

BACKGROUND

Joint assemblies are defined by at least two parts attached together at faying surfaces of the parts. Sometimes unintentional gaps are formed between faying surfaces. Sufficiently wide gaps are often narrowed to satisfy faying surface gap requirements that are particular to some industries, such as the aerospace industry. Wide gaps are narrowed by shimming the gaps, which includes positioning shims within the gaps. Shimming gaps can be time-consuming, difficult, and costly. For example, in conventional assembly techniques, all gaps between faying surfaces must be individually measured and shimmed if the gaps exceed a predetermined threshold. Access to the gaps can be difficult, thus complicating the measurement of the gaps and the installation of shims. Additionally, the parts forming conventional joint assemblies often have faying surfaces with large areas, which increases the time and labor necessary to measure and shim gaps between the faying surfaces. Accordingly, reducing the area of faying surfaces and the amount of shimming for a given joint assembly is desirable.

SUMMARY

The subject matter of the present application provides examples of a joint assembly and method of making the joint assembly that overcome the above-discussed shortcomings of prior art joint assemblies and joint assembly manufacturing techniques. Accordingly, the subject matter of the present application has been developed in response to the present state of the art, and in particular, in response to shortcomings of conventional joint assemblies and conventional techniques for making joint assemblies.

Disclosed herein is an assembly that comprises a first part and a second part. The first part comprises a base surface and a plurality of first through-holes formed in the base surface and extending through the first part. The second part is attached directly to the base surface of the first part. Additionally, the second part comprises a non-faying surface facing the base surface, a plurality of bosses, and a plurality of second through-holes. The plurality of bosses are spaced apart from each other where each boss protrudes from the non-faying surface, and each boss defines a faying surface engaged with a corresponding portion of the base surface of the first part. Each one of the plurality of second through-holes is formed in the faying surface of a corresponding one of the plurality of bosses and is co-axially aligned with a corresponding one of the plurality of first through-holes. The assembly further comprises a plurality of fasteners where each fastener passes through a corresponding one of the plurality of first through-holes and the corresponding one of the plurality of second through-holes that is coaxially aligned with the corresponding one of the plurality of first through-holes. A width of each one of the plurality of bosses is equal to or greater than $2(r+T \tan \theta)$, where $r$ is a maximum radial dimension of an outermost peripheral portion of the fastener, passing through the corresponding second through-hole, in contact with the first part or the second part, $T$ is the distance from the point of contact, between the outermost peripheral portion of the fastener and the first part or the second part, and the faying surface of the corresponding boss, and $\theta$ is an angle between a central axis of the corresponding second through-hole and an outermost load vector initiating at the point of contact between the outermost peripheral portion of the fastener and the first part or the second part. The preceding subject matter of this paragraph characterizes example 1 of the present disclosure.

A total surface area of the faying surfaces of the plurality of bosses is no more than 18% of a total surface area of the non-faying surface. The preceding subject matter of this paragraph characterizes example 2 of the present disclosure, wherein example 2 also includes the subject matter according to example 1, above.

The total surface area of the faying surfaces of the plurality of bosses is no more than 7% of the total surface area of the non-faying surface. The preceding subject matter of this paragraph characterizes example 3 of the present disclosure, wherein example 3 also includes the subject matter according to any one of examples 1-2, above.

A thickness of each one of the plurality of bosses is inclusively between 0.025 inches and 0.035 inches. The preceding subject matter of this paragraph characterizes example 4 of the present disclosure, wherein example 4 also includes the subject matter according to any one of examples 1-3, above.

A maximum distance between the base surface of the first part and the non-faying surface of the second part is equal to the thickness of each one of the plurality of bosses. The preceding subject matter of this paragraph characterizes example 5 of the present disclosure, wherein example 5 also includes the subject matter according to example 4, above.

Each one of the plurality of fasteners comprises a bolt and a nut. The bolt comprises a head and a shank extending from the head. The nut is engaged with the shank of the bolt to secure together the first part and the second part between the head of the bolt and the nut. The variable $r$ is equal to the lesser one of the maximum radial dimension of the outermost peripheral portion of the head in contact with the first part or the second part or the maximum radial dimension of the outermost peripheral portion of the nut in contact with the first part or the second part. The preceding subject matter of this paragraph characterizes example 6 of the present disclosure, wherein example 6 also includes the subject matter according to any one of examples 1-5, above.

The variable $\theta$ is at most 25-degrees. The preceding subject matter of this paragraph characterizes example 7 of the present disclosure, wherein example 7 also includes the subject matter according to any one of examples 1-6, above.

The variable $\theta$ is at most 17-degrees. The preceding subject matter of this paragraph characterizes example 8 of the present disclosure, wherein example 8 also includes the subject matter according to example 7, above.

The assembly further comprises at least one shim, interposed between the base surface and the faying surface of at least one of the plurality of bosses. The preceding subject matter of this paragraph characterizes example 9 of the present disclosure, wherein example 9 also includes the subject matter according to any one of examples 1-8, above.

A gap between the base surface and the faying surface of the at least one of the plurality of bosses is greater than 0.005 inches. A thickness of the at least one shim is substantially equal to the gap. The preceding subject matter of this paragraph characterizes example 10 of the present disclosure, wherein example 10 also includes the subject matter according to example 9, above.

At least one shim is interposed between the base surface and the faying surface of more than one of the plurality of bosses. The preceding subject matter of this paragraph characterizes example 11 of the present disclosure, wherein example 11 also includes the subject matter according to any one of examples 9-10, above.

No shim is interposed between the base surface of the first part and the non-faying surface of the second part. The preceding subject matter of this paragraph characterizes example 12 of the present disclosure, wherein example 12 also includes the subject matter according to any one of examples 9-11, above.

A central axis of each one of the plurality of second through-holes passes through a geometric center of the corresponding one of the plurality of bosses. The preceding subject matter of this paragraph characterizes example 13 of the present disclosure, wherein example 13 also includes the subject matter according to any one of examples 1-12, above.

The assembly further comprises at least one shim, interposed between the base surface and the faying surface of at least one of the plurality of bosses. The first part is made of a fiber-reinforced polymeric material. The second part is made of a metallic material. The preceding subject matter of this paragraph characterizes example 14 of the present disclosure, wherein example 14 also includes the subject matter according to any one of examples 1-13, above.

The width of each one of the plurality of bosses is equal to $2(r+T \tan \theta)$. The preceding subject matter of this paragraph characterizes example 15 of the present disclosure, wherein example 15 also includes the subject matter according to example 14, above.

Also disclosed herein is an aircraft that comprises the assembly of example 1. The preceding subject matter of this paragraph characterizes example 16 of the present disclosure.

The aircraft comprises a wing. The first part comprises a skin panel of the wing. The second part comprises an internal rib of the wing. The preceding subject matter of this paragraph characterizes example 17 of the present disclosure, wherein example 17 also includes the subject matter according to example 16, above.

The aircraft comprises a wing. The first part comprises a skin panel of the wing. The second part comprises an external fitting of the wing. The preceding subject matter of this paragraph characterizes example 18 of the present disclosure, wherein example 18 also includes the subject matter according to example 16, above.

Further disclosed herein is a method of making an assembly. The method comprises indexing a second part to a first part. The second part comprises a non-faying surface and a plurality of bosses. Each boss defines a faying surface directly engaged with a base surface of the first part. The method also comprises, after the second part is indexed to the first part, measuring a gap between the base surface and the faying surface of at least one of the plurality of bosses. The method further comprises, if the gap is greater than a predetermined threshold, interposing at least one shim in the gap between the base surface and the faying surface of the at least one of the plurality of bosses, and fastening the first part to the second part with the at least one shim interposed between the base surface and the faying surface of the at least one of the plurality of bosses. The method additionally comprises, if the gap is less than or equal to the predetermined threshold, maintaining a shimless engagement between the base surface and the faying surface of the at least one of the plurality of bosses. The preceding subject matter of this paragraph characterizes example 19 of the present disclosure.

A width of each one of the plurality of bosses is equal to or greater than $2(r+T \tan \theta)$, where r is a maximum radial dimension of an outermost peripheral portion of a fastener, passing through a corresponding one of a plurality of second through-holes of the second part, in contact with the first part or the second part, T is the distance from a point of contact, between the outermost peripheral portion of the fastener and the first part or the second part, and the faying surface of the corresponding boss, and $\theta$ is an angle between a central axis of the corresponding second through-hole and an outermost load vector initiating at the point of contact between the outermost peripheral portion of the fastener and the first part or the second part. The method further comprises not measuring a second gap between the base surface and a non-faying surface of the second part. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a joint assembly and a method of making a joint assembly that promotes a reduction in costs and assembly time by reducing the faying surface area (e.g., area of a faying surface) of one of the parts of the joint assembly. Reducing the faying surface area of the joint assembly shortens the measuring process for determining gaps between faying surfaces that require shimming. In one example, the joint assembly and method disclosed herein improved conventional assemblies and methods by essentially replacing a single faying surface shim on a mating part with multiple smaller faying surface shims, with each shim corresponding with a single fastener or select groups of fasteners. Moreover, the amount of shimming material and corresponding processing of the shimming material is reduced because the surface area of the faying surfaces is less. Notwithstanding the reduction in the faying surface area of the joint assembly, the load transfer capability of the joint assembly is maintained.

Figure 1A:
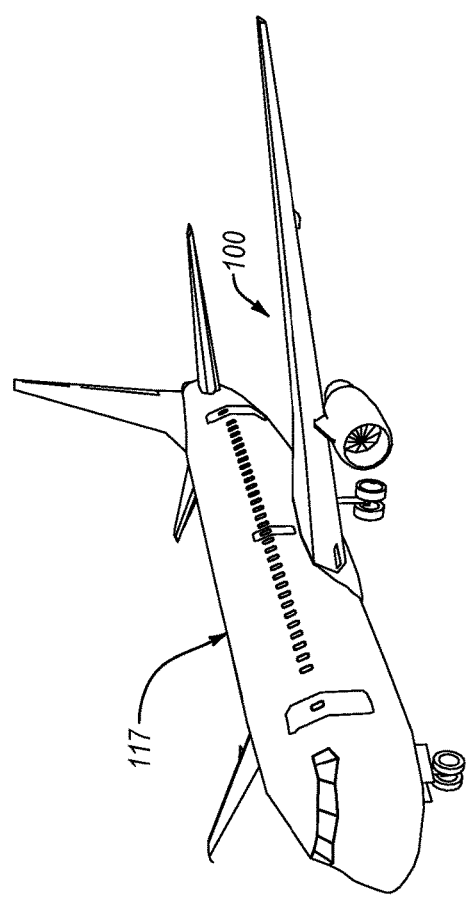
FIG. 1A is a perspective view of an aircraft, according to one or more examples of the present disclosure.
Figure 1B:
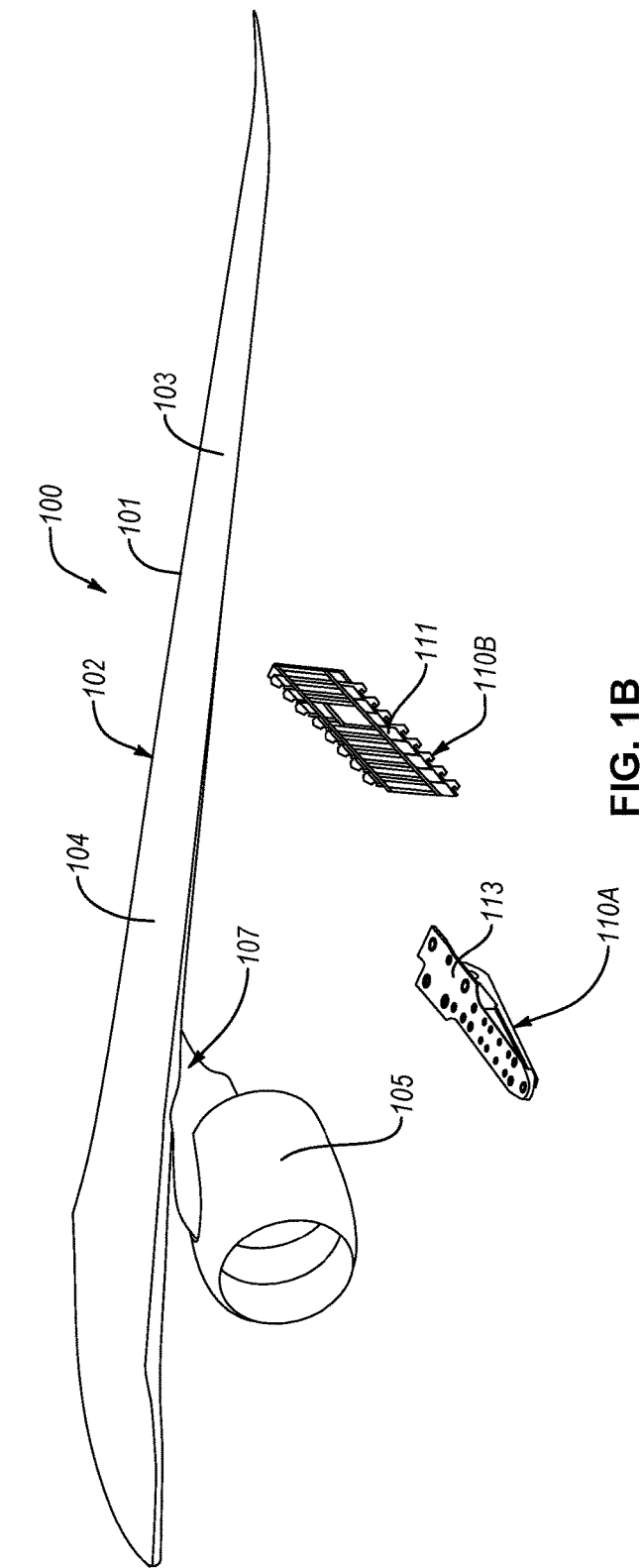
FIG. 1B is an exploded perspective view of a joint assembly of an aircraft, according to one or more examples of the present disclosure.

Referring to FIGS. 1A and 1B, a joint assembly 100, according to some examples, is shown in exploded view. The joint assembly 100 includes a first part 102 and one or more second parts, such as second part 110A and second part 110B. The first part 102 includes a structure 104 to which the second part 110A and the second part 110B is attached. According to some examples, as shown in FIGS. 1A and 1B, the joint assembly 100 is or is part of an aircraft 117 or a wing 101 of the aircraft 117 and the structure 104 is a skin panel 103 of the aircraft 117 or the wing 101 of the aircraft 117.

In the illustrated example, the second part 110A is an engine attachment external fitting 113 or other external fitting that is attached to an external surface of the skin panel of the aircraft or the wing assembly. An external fitting is configured to help secure external components, such as an engine, landing gear, stability and control devices, an auxiliary fuel tank, etc., to the aircraft or the wing assembly. For instance, with reference to FIGS. 1A and 1B, the second part 110A can help secure an engine 105 to the wing 101 at location 107. Typically, external components are secured using larger-diameter shear pins. These shear pins are offset from the wing box monocoque structure. Accordingly, reaction force, in addition to reaction moment, are required capacities for static equilibrium. By definition, the shear reaction force is parallel to and translates directly into monocoque skin or spar mid-surfaces, which have adequate capacity to react to the shear and dissipate it. Typically, the reaction moment manifests as a reaction force with vector components that can be described parallel (shear) and perpendicular (tension/compression) to the coordinate system of the local monocoque mid-surface.

Additionally, in the illustrated example, the second part 110B is an internal rib 111 of the wing 101 that is attached to the internal surfaces of the upper and lower skin panels 103 and of the front and rear spars (not shown) of the wing 101. The internal rib 111 extends chordwise across the wing and stabilizes the closed-cell torque box, reacts with external and internal pressure loading, and helps couple together spaced-apart stringers, which extend spanwise along the wing. Also, the perpendicular vector components from the second part 110A pass through the skin panel and are reacted by second part 110B. The perpendicular vector components reacted by an internal rib 111 are beamed to the spars via the internal rib 111. Although shown as an external fitting 113 and an internal rib 111 of a wing 101 or wing assembly, in other examples, the second part 110A and the second part 110B are attached to other parts of an aircraft, such as stabilizers, fuselage, and/or the like. Furthermore, although the second part 110A and the second part 110B are depicted as an external fitting 113 and an internal rib 111, respectively, in other examples, the second part 110A and the second part 110B are any of various other parts attached to an aircraft where the parts are configured to transfer loads on the aircraft.

Figure 2:
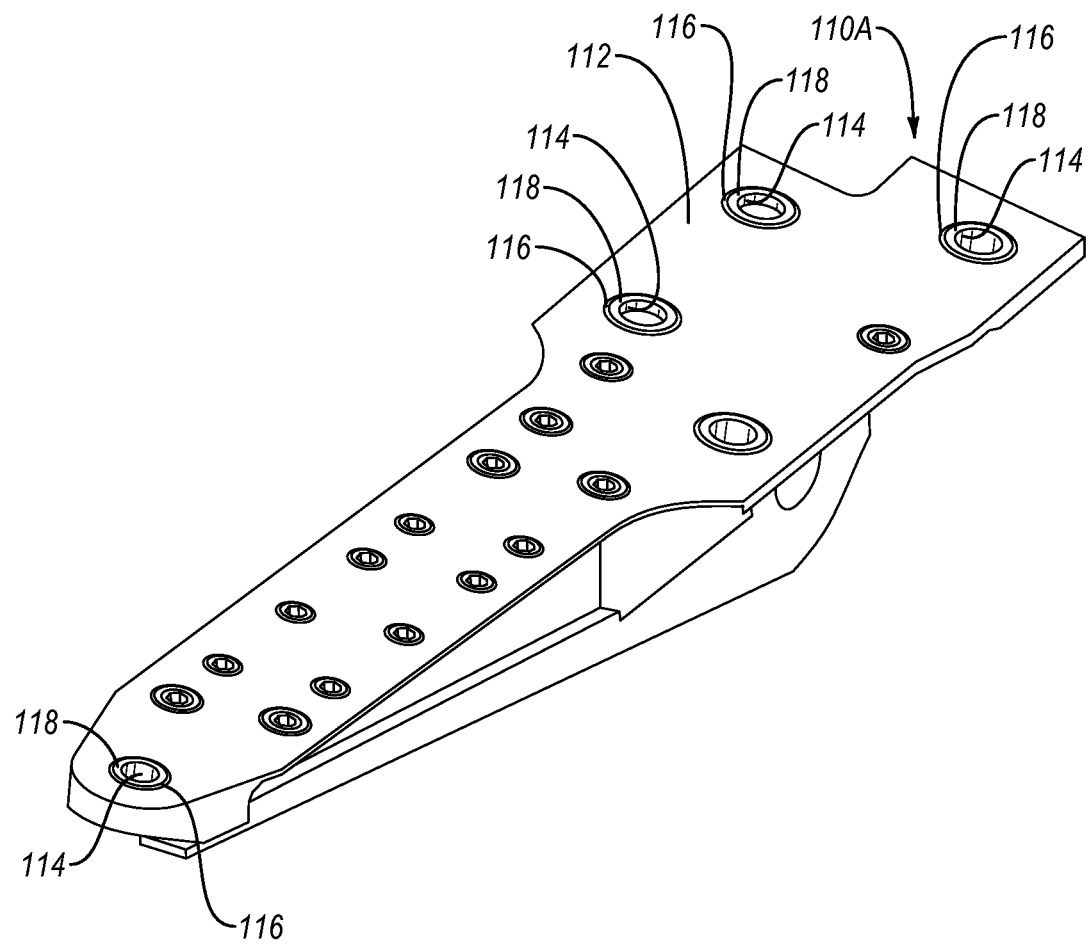
FIG. 2 is a perspective view of one part of the joint assembly of FIG. 1B, according to one or more examples of the present disclosure.

As shown in FIG. 2, the second part 110A includes a non-faying surface 112 and a plurality of bosses 116 protruding from the non-faying surface 112. The bosses 116 (e.g., pad-ups) are spaced apart from each other about the non-faying surface. The distances between at least some of the bosses 116 are the same in some examples and different in other examples. In certain examples, the quantity of the bosses 116 and the spacing of the bosses 116 relative to each other is based on a predicted distribution of the transfer loads on the second part 110A. For example, to accommodate non-uniform transfer load distributions, the second part 110A can have more bosses 116 per unit area at locations on the second part 110A that are predicted to experience higher transfer loads than at other locations.

Each boss 116 includes a faying surface 118 defined as a distal-most surface of the boss 116 away from the non-faying surface 112. In other words, the faying surface 118 of each boss 116 is offset from the non-faying surface 112 by a distance equal to the height (H) of the boss 116 (see, e.g., FIG. 5A). Moreover, because of the boss 116, a space is defined between the non-faying surface 112 of the second part 110A and the base surface 120 of the first part 102. The faying surface 118 of each boss 116 is configured to directly engage (e.g., contact) a base surface of the first part 102. Accordingly, as used herein, a faying surface is a surface configured to directly engage a base surface of a mating part and a non-faying surface is a surface configured to be distanced from or not directly engaged with the surface of a mating part. The contour of the faying surface 118 of each boss 116 depends on the contour of the base surface of the mating part to which the faying surface 118 is configured to directly engage. Therefore, the faying surface 118 is flat when the base surface of the mating part is flat and the faying surface 118 is contoured to match a contour of the base surface when the base surface is contoured.

The outer periphery of a boss 116 defines the shape of the boss 116. In FIG. 2, the bosses 116 have a circular shape. However, in other examples, the bosses 116 have a non-circular shape, such as a rectangle, square, triangular, or other polygonal shape. In the illustrated examples, the shape of the bosses 116 is constant along the height of the bosses 116. In other words, according to some examples, the outer peripheral wall that defines the shape of the boss 116 is perpendicular to the portion of the non-faying surface 112 of the second part 110A from which the boss 116 protrudes.

The second part 110A also includes a plurality of through-holes 114. Each one of the through-holes 114 is formed in the faying surface 118 of a corresponding one of the bosses 116 and extend entirely through the corresponding boss 116 and the non-faying surface from which the boss 116 protrudes. In other words, each through-hole 114 passes through a corresponding one of the bosses 116 and the portion of the second part 110A underlying the corresponding boss 116.

Figure 3:
FIG. 3 is a perspective view of another part of the joint assembly of FIG. 1B, according to one or more examples of the present disclosure.
Figure 4:
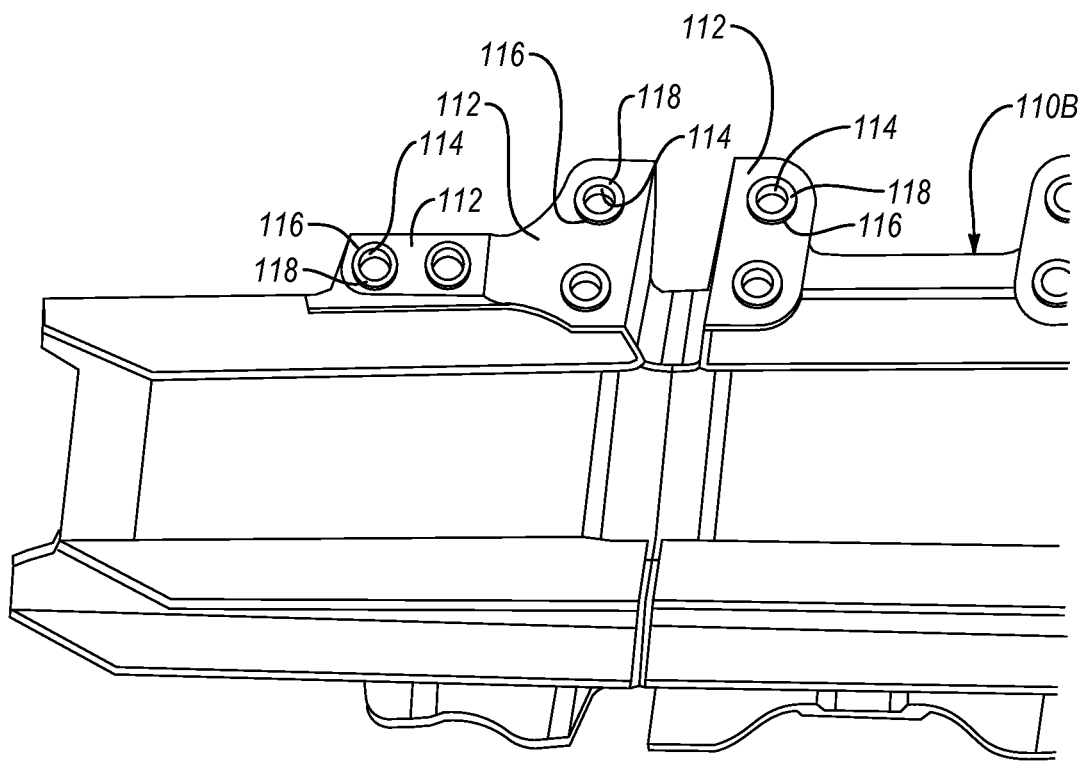
FIG. 4 is a perspective view of a portion of the part of FIG. 3, according to one or more examples of the present disclosure.

Similar to the second part 110A, the second part 110B, as shown in FIGS. 3 and 4, includes a plurality of bosses 116 and a plurality of through-holes 114. The bosses 116 and the through-holes 114 of the second part 110B are configured the same as the bosses 116 and the through-holes 114 of the second part 110A. Accordingly, the description of the bosses 116 and the through-holes 114 with regard to the second part 110A applies equally to the bosses 116 and the through-holes 114 of the second part 110B. However, instead of having a single continuous non-faying surface 112 like the second part 110A, the second part 110B includes multiple discontinuous or spaced apart non-faying surfaces 112. Each one of the non-faying surfaces 112, or non-faying surface segments, includes at least two bosses 116 protruding therefrom and at least two through-holes 114 each passing through a respective one of the two bosses 116.

Figure 5A:
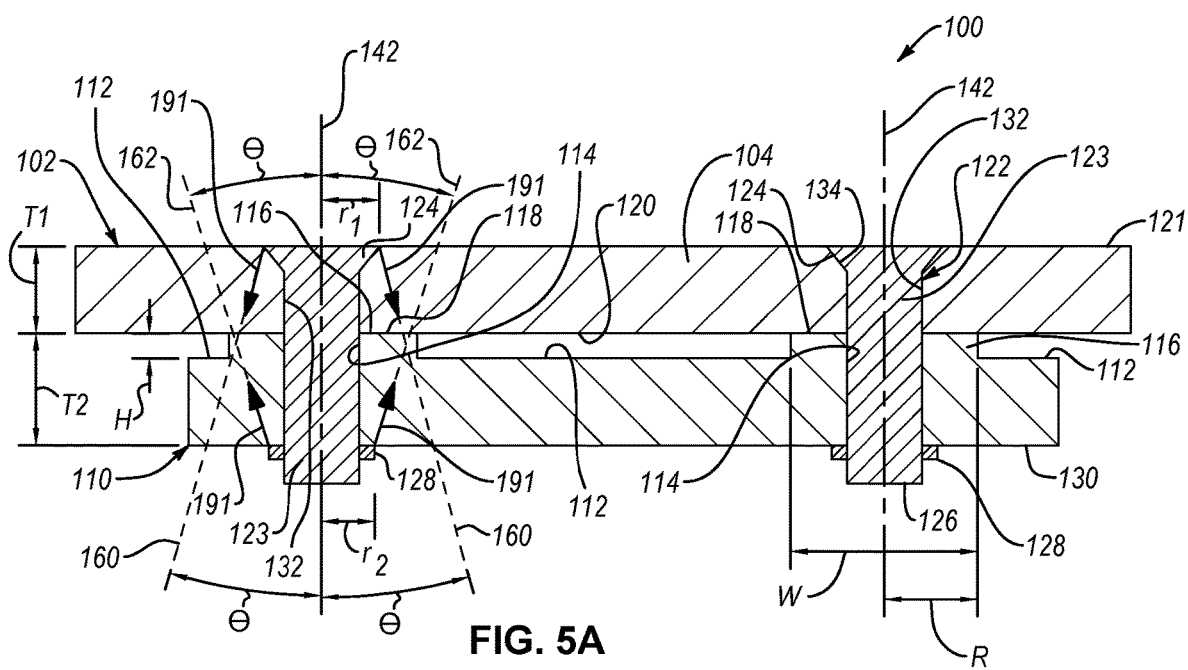
FIG. 5A is a cross-sectional side view of a joint assembly, according to one or more examples of the present disclosure.

Referring to FIG. 5A, one example of a joint assembly 100 is shown. The joint assembly 100 is similar to the joint assembly 100 of FIG. 1B, with like numbers referring to like features. For example, the joint assembly 100 of FIG. 5A includes a first part 102 and a second part 110 attached to the first part. The second part 110 includes features similar to the second part 110A and the second part 110B. Accordingly, the features and the associated description of the features of the second part 110A and the second part 110B are equally applicable to the second part 110. In some examples, the second part 110 of FIG. 5A represents one of the second part 110A or the second part 110B.

As shown in FIG. 5A, the first part 102 of the joint assembly 100 includes a base surface 120 and a plurality of through-holes 132 formed in the base surface 120. The through-holes 132 extend entirely through the first part 102 from the base surface 120 to a non-facing surface 121 of the first part 102 that is opposite the base surface 120. As used herein, the non-facing surface 121 is the surface of the first part 102 that faces away from the second part 110.

The through-holes 132 of the first part 102, which can be considered first through-holes 132, are alignable with the through-holes 114 of the second part 110, which can be considered second through-holes 114. More specifically, a central axis 142 of each first through-hole 132 is coaxially alignable with a central axis 142 of a corresponding one of the second through-holes 114. The second through-holes 114 extend entirely through the second part 110 from the faying surfaces 118 of the bosses 116 to a non-facing surface 130 of the second part 110. As used herein, the non-facing surface 130 is the surface of the second part 110 that faces away from the first part 102. The first part 102 and the second part 110 are secured together by a plurality of fasteners 122. Each fastener 122 includes a bolt 123 (e.g., screw) and a corresponding nut 128 engaged with the bolt 123, although other fastening arrangement can be used. Each coaxially aligned first through-hole 132 and second through-hole 114 is configured to receive a corresponding one of a plurality of bolts 123 of the joint assembly 100. Accordingly, each one of the plurality of bolts 123 passes through a corresponding one of a plurality of coaxially aligned pairs of first through-holes 132 and second through-holes 114. The first through-holes 132 and the second through-holes 114 are sized to nestably retain the bolts 123 such that the bolts 123 remain coaxially aligned with the central axes 142 of the first through-holes 132 and the second through-holes 114 when received in the through-holes.

The bolts 123 includes a head 124 and a shank 126 extending from the head 124. In some examples, the first through-holes 132 include a countersink portion 134, formed in the non-facing surface 121 of the first part 102, that is configured to nestably receive the head 124 (which is a countersunk head in FIG. 5A) of a corresponding one of the bolts 123. Nestable engagement between head 124 of a bolt 123 and the countersink portion 134 of a first through-hole 132 allows the head 124 to sit flush with or below the non-facing surface 121 and prevents movement of the head 124, and thus the bolt 123, in a direction toward the second part 110 along the central axes 142 of the through-holes. Movement of the bolt 123, in a direction toward the first part 102 along the central axes 142 of the through-holes, is prevented by engagement with a nut 128, secured to the shank 126 of the bolt 123, with the non-facing surface 130 of the second part 110. In some examples, the shank 126 is externally threaded and the nut 128, which is internally threaded, threadably engages the shank 126 to secure the nut 128 to the shank 126. Although the countersink portion 134 is shown as forming part of the first through-hole 132 of the first part 102 and the nut 128 is shown engaged with the non-facing surface 130 of the second part 110, in other examples, the countersink portion 134 forms part of the second through-hole 114 of the second part 110 and the nut 128 is engaged with the non-facing surface 121 of the first part 102.

Figure 5B:
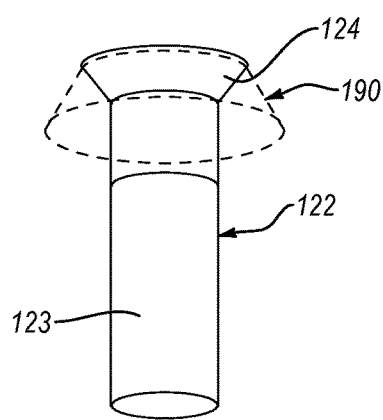
FIG. 5B is a perspective view of a fastener of the joint assembly of FIG. 5A, according to one or more examples of the present disclosure.
Figure 5C:
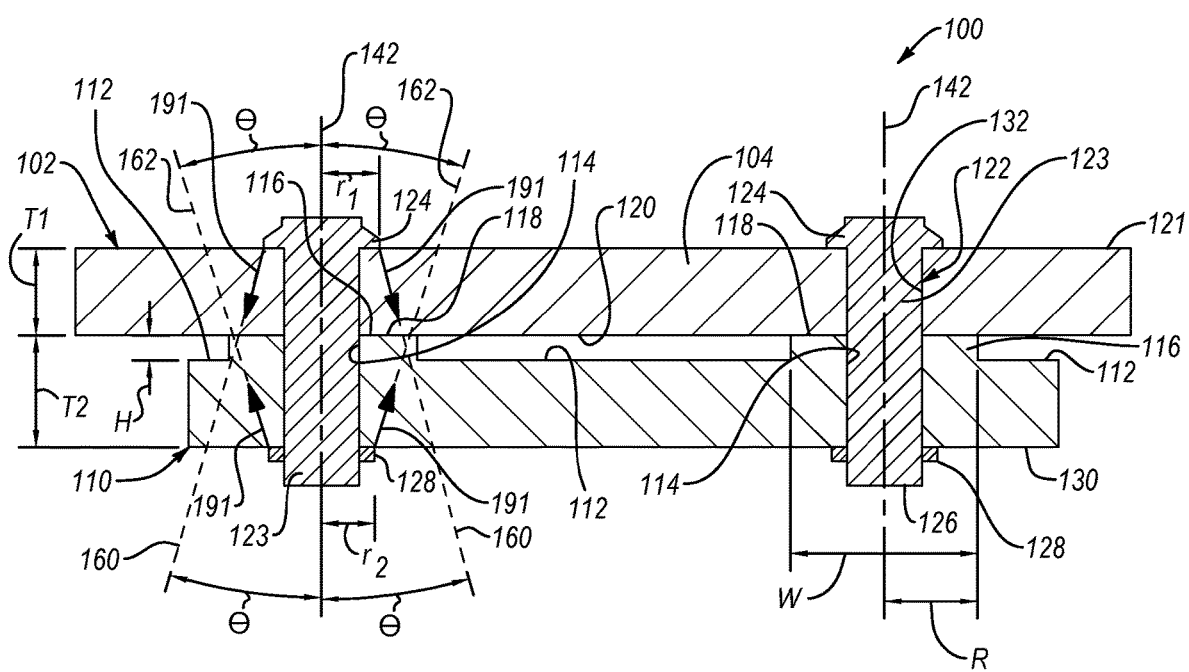
FIG. 5C is a cross-sectional side view of a joint assembly, according to one or more examples of the present disclosure.
Figure 5D:
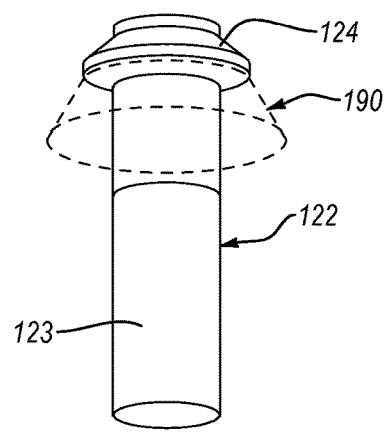
FIG. 5D is a perspective view of a fastener of the joint assembly of FIG. 5C, according to one or more examples of the present disclosure.

Additionally, in some examples, as shown in FIG. 5C, the head 124 of the bolt 123 not a countersunk head, but rather is a non-countersunk head, such as a domed head, a button head, or a pan head. In the example of FIG. 5C, the first through-hole 132 is not countersunk such that the head 124 of the bolt 123 rests on a non-countersunk portion of the non-facing surface 121 of the first part 102. Accordingly, in some examples, neither of the first through-hole 132 nor the second through-hole 114 is countersunk and the head 124 of the bolt 123 engages the non-facing surface of the corresponding one of the first part 102 or the second part 110.

With the first through-holes 132 coaxially aligned with corresponding second through-holes 114, and bolts 123 passing through corresponding pairs of coaxially aligned first through-holes 132 and second through-holes 114, securing the nuts 128 to the shanks 126 of corresponding bolts 123 and tightening the nuts 128 relative to the shanks 126 tightens the faying surfaces 118 of the bosses 116 of the second part 110 against the base surface 120 of the first part 102 to form the joint assembly 100. When the joint assembly 100 is formed, no portion of the non-faying surface 112 of the base surface 120 is in contact with the base surface 120 of the first part 102. In fact, the non-faying surface 112 is offset from the base surface 120 by at least the height (H) of the bosses 116 in some examples. In some examples, the height (H) of the bosses 116 is inclusively between 0.025 inches and 0.035 inches. In yet certain examples, the maximum distance between the base surface 120 and the non-faying surface 112 is equal to the height (H) of the bosses 116. Accordingly, with the joint assembly 100 formed, the only surface of the second part 110 in contact with the first part 102 is the faying surface 118 of each one of the bosses 116.

Figure 5E:
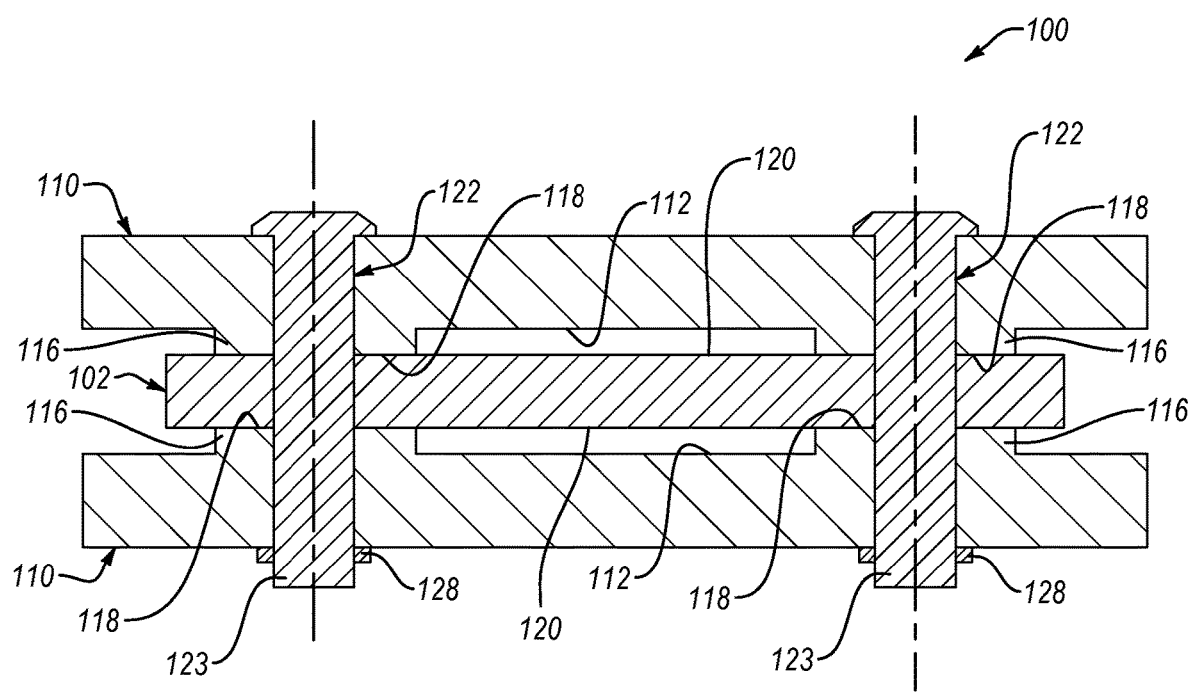
FIG. 5E is a cross-sectional side view of a joint assembly, according to one or more examples of the present disclosure.

To show that alternative examples of the joint assembly 100 are possible, FIG. 5E illustrates one alternative example of the joint assembly 100. Like the joint assembly 100 of FIG. 5A, the joint assembly 100 of FIG. 5E includes a first part 102 and a second part 110, where the second part 110 includes bosses 116. However, unlike the joint assembly 100 of FIG. 5A, the joint assembly 100 of FIG. 5E includes an additional second part 110, with bosses 116, that is attached to an opposite side of the first part 102. In other words, the joint assembly 100 of FIG. 5E includes two second parts 110 attached to the first part 102 on opposite sides of the first part 102. Accordingly, the first part 102 is sandwiched between two second parts 110. The fasteners 122 are configured to secure both of the second parts 110 to the first part 102.

In certain examples, the total surface area of the faying surfaces 118 of the bosses 116 is less than the total surface area of the non-faying surface(s) 112. According to one example, and with particular reference to the second part 110A of FIG. 2, the faying surfaces 118 of the bosses 116 and the non-faying surface(s) 112 account for about 6% and about 94%, respectively, of the total surface area of the second part 110 facing the first part 102. Therefore, in this example, the total surface area of the faying surfaces 118 is no more than 7% of the total surface area of the non-faying surfaces(s) 112 of the second part 110. In another example, and with particular reference to the second part 110B of FIGS. 3 and 4, the faying surfaces 118 of the bosses 116 and the non-faying surface(s) 112 account for 15% and 85%, respectively, of the total surface area of the second part 110 facing the first part 102. Therefore, in this additional example, the total surface area of the faying surfaces 118 is no more than 18% of the total surface area of the non-faying surfaces(s) 112 of the second part 110.

The percentage of the surfaces of the second part 110 that face the first part 102 and are engaged directly with the first part 102 is significantly lower (e.g., up to 94% lower) than conventional assemblies, particularly those used in aerospace applications. However, the lower surface area engaged directly with the first part 102, compared to conventional assemblies, does not negatively impact the ability of the joint assembly 100, and particularly the second part 110 of the joint assembly 100, to handle the transfer of loads (e.g., clamp-up compression bearing loads) through the joint assembly 100. As described in more detail with reference to FIG. 5A, load transfer between two parts attached together by fasteners occurs primarily through the fasteners and the immediately surrounding structure that supports the fasteners. Accordingly, locating the bosses 116, and the corresponding faying surfaces 118, at the second through-holes 114, allows the second part 110 to adequately transfer loads (e.g., represented by arrows 191 in FIG. 5A) through the joint assembly 100 with such a large percentage of non-faying surface(s) 112 facing the first part 102.

Referring to FIG. 5A, the volume of residence of the clamp-up compression bearing load (e.g., as represented by arrows 191) between the first part 102 and the second part 110 are shown in dashed lines 162 and the dashed lines 160. In other words, integration of the clamp-up compression bearing load, which is manifested as compression bearing of the faying surface 118 and the base surface 120, balances equally and oppositely the fastener tension pre-load. The fastener tension pre-load results from the elongation of the bolt by means of torque application to the nut. The fastener tension pre-load is prescribed targeting zero gapping at particular loading conditions, e.g., no gapping at or below design limit load. The residual clamp-up compressing bearing contact loading resulting from fastener tension pre-load resulting from torque application to the nut on the assembled structure at the fastener location must be overcome by loading manifested as pulling the assembled structure apart before compression bearing contact between the faying surfaces disappears and the joint gaps. All the assembly build load vectors of concern from the first part 102 to the second part 110 are located within a frusto-conical shaped region 190 (see, e.g., FIG. 5B) defined by the dashed lines 160 and the clamp-up compression load vectors from the second part 110 to the first part 102 are located within a frusto-conical shaped region (similar to the frusto-conical shaped region 190) defined by the dashed lines 162. The frusto-conical shaped regions are coaxial or concentric with the central axis 142, such that the dashed lines 160 and the dashed lines 162 extend 360-degrees around the central axes 142 of the first through-hole 132 and the second through-hole 114 to each define a frusto-conical shaped maximum transfer load range corresponding with the same-shaped regions.

Transfer loads from the first part 102 to the second part 110 initiate at the interface between the head 124 of the bolt 123 and the first through-hole 132. Accordingly, the dashed lines 160 extend from the outer periphery of the head 124 at an angle θ with the central axis 142 of the first through-hole 132. Similarly, transfer loads from the second part 110 to the first part 102 initiate at the interface between the nut 128 and the non-facing surface 130 of the second part 110. Accordingly, the dashed lines 162 extend from the outer periphery of the nut 128, at the non-facing surface 130, at an angle θ with the central axis 142 of the first through-hole 132. In this manner, the frusto-conical shaped maximum transfer load ranges between the first part 102 and the second part 110 have a maximum span of two times the angle θ. In one example, the angle θ is at most 25-degrees. According to another example, the angle θ is at most 17-degrees. According to yet another example, the angle θ is at most 15-degrees.

To provide sufficient structure to accommodate the ranges of transfer loads between the first part 102 and the second part 110 at a given fastener 122, a width (W) of the corresponding boss 116 is at least as wide as the maximum transfer load ranges along the height of the boss 116. Accordingly, as shown in FIG. 5A, the width (W) of the boss 116 is sufficient such that all transfer loads within the maximum transfer load ranges (e.g., between the dashed lines 160 and the dashed lines 162) pass through the boss 116. Because the maximum transfer load ranges can be symmetrical across a plane parallel to and passing through the central axes 142 of the first through-hole 132 and the second through-hole 114, in some examples, each boss 116 is symmetrical across the same plane. Moreover, in certain examples, the central axes 142 of the first through-hole 132 and the second through-hole 114 pass through a geometric center of the boss 116 corresponding with the first through-hole 132 and the second through-hole 114. Accordingly, in some examples, the boss 116 is concentric with the second through-hole 114 extending therethrough.

For any type of fastener 122, in some examples, a width (W) of each one of the plurality of bosses 116 is equal to or greater than $2(r+T \tan \theta)$. This equation is derived from the cross-sectional shape of the maximum transfer load range, which as described above is a frusto-conical shape. In the equation, r is a maximum radial dimension of the outermost peripheral portion of the fastener 122, passing through the corresponding second through-hole 114, in contact with the first part 102 or the second part 110, T (e.g., T1 or T2 in FIG. 5A) is the distance from the point of contact, between the outermost peripheral portion of the fastener 122 and the first part 102 or the second part 110, and the faying surface 118 of the corresponding boss 116, and $\theta$ is an angle between the central axis 142 of the corresponding second through-hole 114 and the outermost load vector initiating at the point of contact between the outermost peripheral portion of the fastener 122 and the first part 102 or the second part 110. The outermost peripheral portion of the fastener 122 in contact with the first part 102 or the second part 110 has a maximum radial dimension regardless of the cross-sectional shape of the outermost peripheral portion of the fastener 122. In other words, the term "radial dimension" does not imply or require a circular-shaped cross-section. Instead, as used herein, a radial dimension is the dimension extending perpendicularly away from a central axis of the fastener 122.

According to certain examples where the fastener 122 includes the bolt 123 and the nut 128, the width (W) of each boss 116 is equal to or greater than the minimum of $2(r1+T1 \tan \theta)$ or $2(r2+T2 \tan \theta)$. The variable r1 is the maximum radial dimension of the head 124 of the bolt 123 of the fastener 122 in contact with the first part 102 as shown in FIG. 5A. The variable r2 is the maximum radial dimension of the nut 128 of the fastener 122 in contact with the second part 110 as shown in FIG. 5A. Accordingly, in certain examples, the width (W) of each boss 116 is equal to or greater than $2(r+T \tan \theta)$, where r is equal to the lesser one of the maximum radial dimension of the outermost peripheral portion of the head 124 in contact with the first part 102 or the second part 110 or the maximum radial dimension of the outermost peripheral portion of the nut 128 in contact with the first part 102 or the second part 110. Where the head 124 or the nut 128 has a circular shaped cross-section, the maximum radial dimension r1 of the head 124 is the radius of the head 124 in contact with the first part 102 and the maximum radial dimension r2 of the nut 128 is the radius of the nut 128. In implementations where one or both of the head 124 and the nut 128 has a non-circular shaped cross-section (such as hexagonal), the maximum radial dimension r1 of the head 124 is half of the head 124 at a maximum width of the head 124 and the maximum radial dimension r2 of the nut 128 is half of the nut 128 at a maximum width of the nut 128. By applying the above-presented equation, the corresponding width (W) of the bosses 116 will be sufficiently large to capture the transfer load vectors emanating from both the head 124 and the nut 128.

As depicted in FIG. 5A, the distance T1 is a thickness of the first part 102 and the distance T2 is the total thickness of the second part 110, including the distance between the non-faying surface 112 and non-facing surface 130 and the height H of the boss 116.

The variable $\theta$ is an angle between the central axis 142 of the corresponding second through-hole 114 and an outermost load vector initiating at the point of contact between the outermost peripheral portion of the fastener 122 and the first part 102 or the second part 110. Accordingly, as shown in FIG. 5A, the variable $\theta$ is the angle $\theta$ between the central axis 142 and a corresponding one of a dashed line 160 or a dashed line 162.

Because the faying surfaces 118 of the joint assembly 100 are reduced compared to conventional assemblies, the likelihood that gaps exist that require shimming is reduced, to zero in some instances. However, referring to FIG. 6, according to some examples, after the second part 110 is attached to the first part 102 as described above, a gap between the base surface 120 of the first part 102 and the faying surface 118 of a boss 116, which requires shimming, may exist. Such gaps are not intentionally implemented into the design of the joint assembly 100. However, due to manufacturing tolerances and other manufacturing limitations, gaps may be formed between the base surface 120 and the faying surface 118 after the joint assembly 100 is initially formed. In some industries, such as the automotive and aerospace industries, gaps between faying surfaces of two parts can be regulated. In such industries, gaps between faying surfaces cannot be greater than some predetermined maximum threshold. In the aircraft industry, the predetermined maximum threshold can be 0.005 inches. Should a gap between two faying surfaces exceed a predetermined maximum threshold, the gap is required to be closed to below the predetermined maximum threshold for implementation into an operating structure, such as a vehicle or aircraft.

One method for closing gaps to comply with gap regulations is shimming the gaps. Shimming involves the placement of one or more shims (e.g., thin strips of material) within the gap to effectively close the gap. Because only those gaps that do not meet the predetermined maximum threshold need shimming, gaps are typically measured to determine whether they are in compliance with the predetermined maximum threshold. The more faying surfaces to measure, the greater the time, effort, and cost to comply with the gap regulations. Accordingly, because of the relatively low ratio of faying surfaces 118 to non-faying surfaces 112 of the second part 110, measuring the gaps of the second part 110 for gap compliance takes less time, effort, and money than conventional assemblies with higher ratios of faying surfaces to non-faying surfaces.

Figure 6:
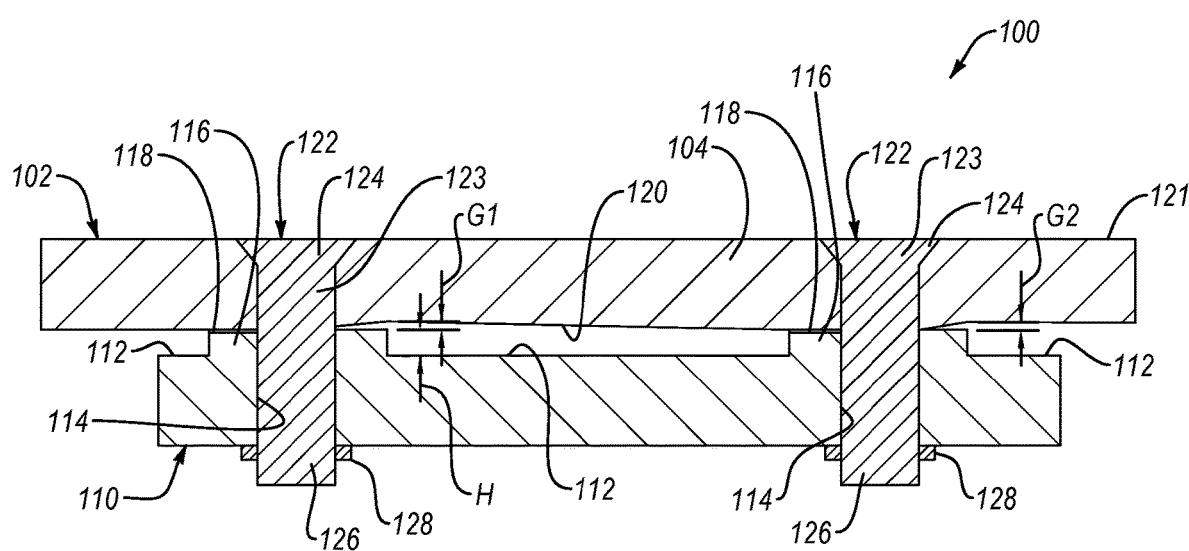
FIG. 6 is a cross-sectional side view of a joint assembly, without shims, according to one or more examples of the present disclosure.
Figure 8:
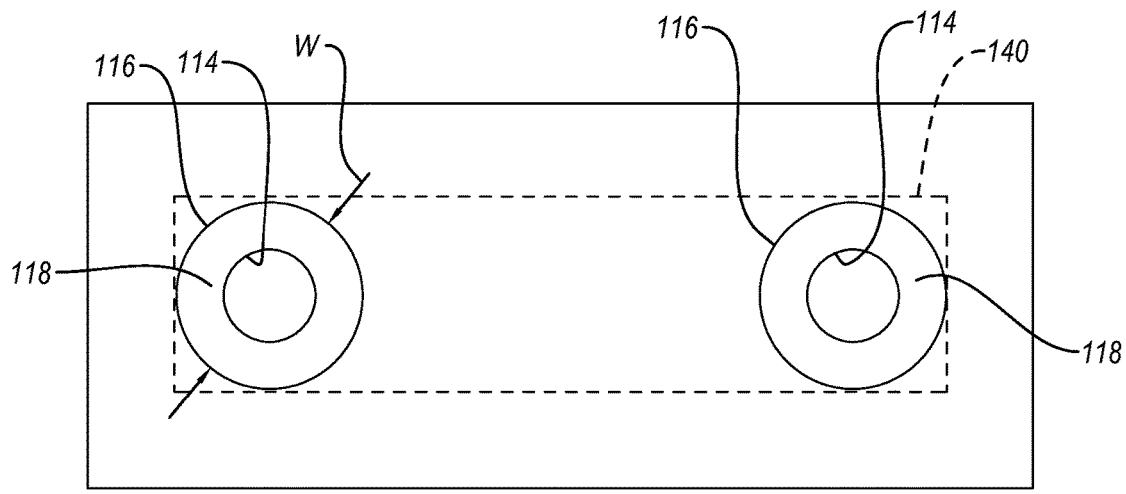
FIG. 8 is a top plan view of a part of a joint assembly, according to one or more examples of the present disclosure.

As shown in FIG. 6, according to one example, after attaching the first part 102 to the second part 110, a gap G1 exists between the faying surface 118 of one boss 116 and the base surface 120 of the first part 102 and a gap G2 exists between the faying surface 118 of another boss 116 and the base surface 120 of the first part 102. The gap G1 can be the same size as or a different size than the gap G2. Referring to FIG. 8, after the gap G1 and the gap G2 are detected and measured, if the gaps are greater than the predetermined maximum threshold, one or more shims 140 is positioned within the gap G1 and one or more shims 140 is positioned within the gap G2. The thickness of single shim 140 or combined shims 140 positioned in the gap G1 is substantially equal to the size of the gap G1 in some examples. Similarly, in certain examples, the thickness of single shim 140 or combined shims 140 positioned in the gap G2 is substantially equal to the size of the gap G2. However, it is recognized that in some examples, the thickness of the shim 140 or shims 140 is such that any gap remaining in the gap G1 or the gap G2, after the shims 140 are located therein, does not exceed the predetermined maximum threshold. In examples where multiple shims 140 are located within the gap G1 or the gap G2, the thicknesses of the shims 140 can be the same or different. As used herein, the term "substantially" means less than or equal to a 5% deviation.

Figure 7:
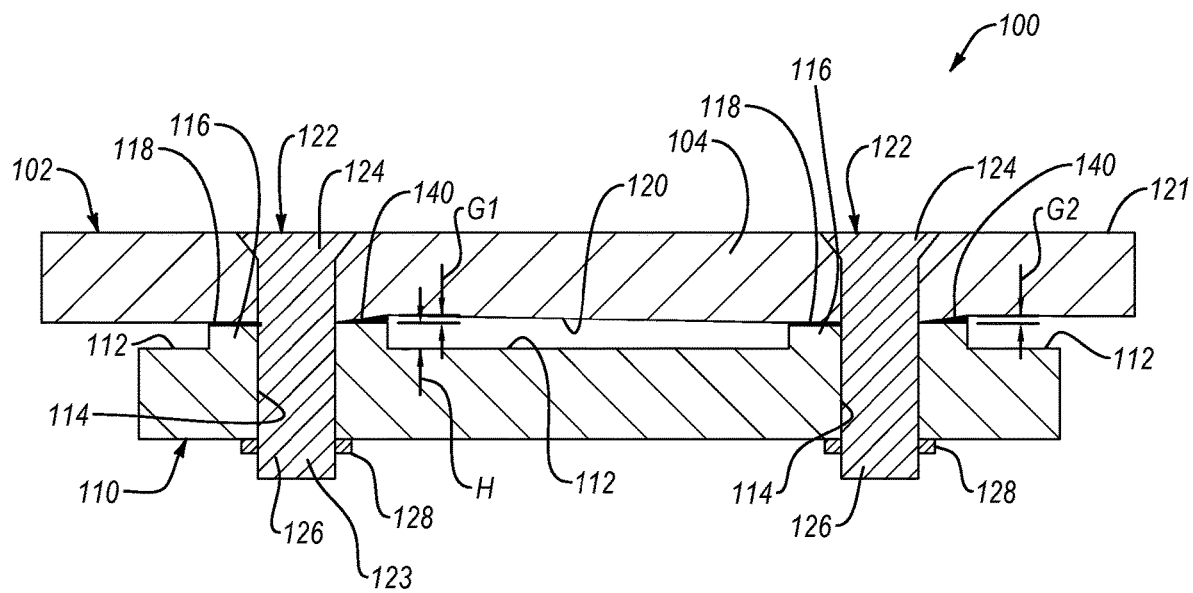
FIG. 7 is a cross-sectional side view of the joint assembly of FIG. 6, with shims, according to one or more examples of the present disclosure.

According to certain examples, as shown in FIG. 7, each shim 140 is located only within a gap between the faying surface 118 of a boss 116 and the base surface 120 of the first part 102. In other words, in such examples, no shim is interposed between the base surface 120 of the first part 102 and the non-faying surface 112 of the second part 110. This configuration helps save on the costs associated with shimming material. However, in some examples, as shown in FIG. 8, a single shim 140 can span from the faying surface 118 of one boss 116 to the faying surface 118 of another boss. Thus, a single shim 140 can fill the gap between two bosses 116 and the base surface 120 of the first part 102. Spanning at least two bosses 116 with a single shim 140, as shown in FIG. 8, also helps retain the shim 140 in place and prevents rotation of the shim 140.

The first part 102 is made of any of various materials. In one particular example, the first part 102 is made of a fiber-reinforced polymeric material, such as where the fiber is a carbon-based fiber. The second part 110 is made of a metallic material, in certain examples, which allows the bosses 116 to be formed using machining techniques. According to some examples, the first part 102 is made of a fiber-reinforced polymeric material and the second part 110 is made of a metallic material. The shims 140 are made of any of various materials. In one example, the shims 140 are made of a fiber-reinforced polymeric material, which can be a carbon-fiber-reinforced polymeric material.

Figure 9:
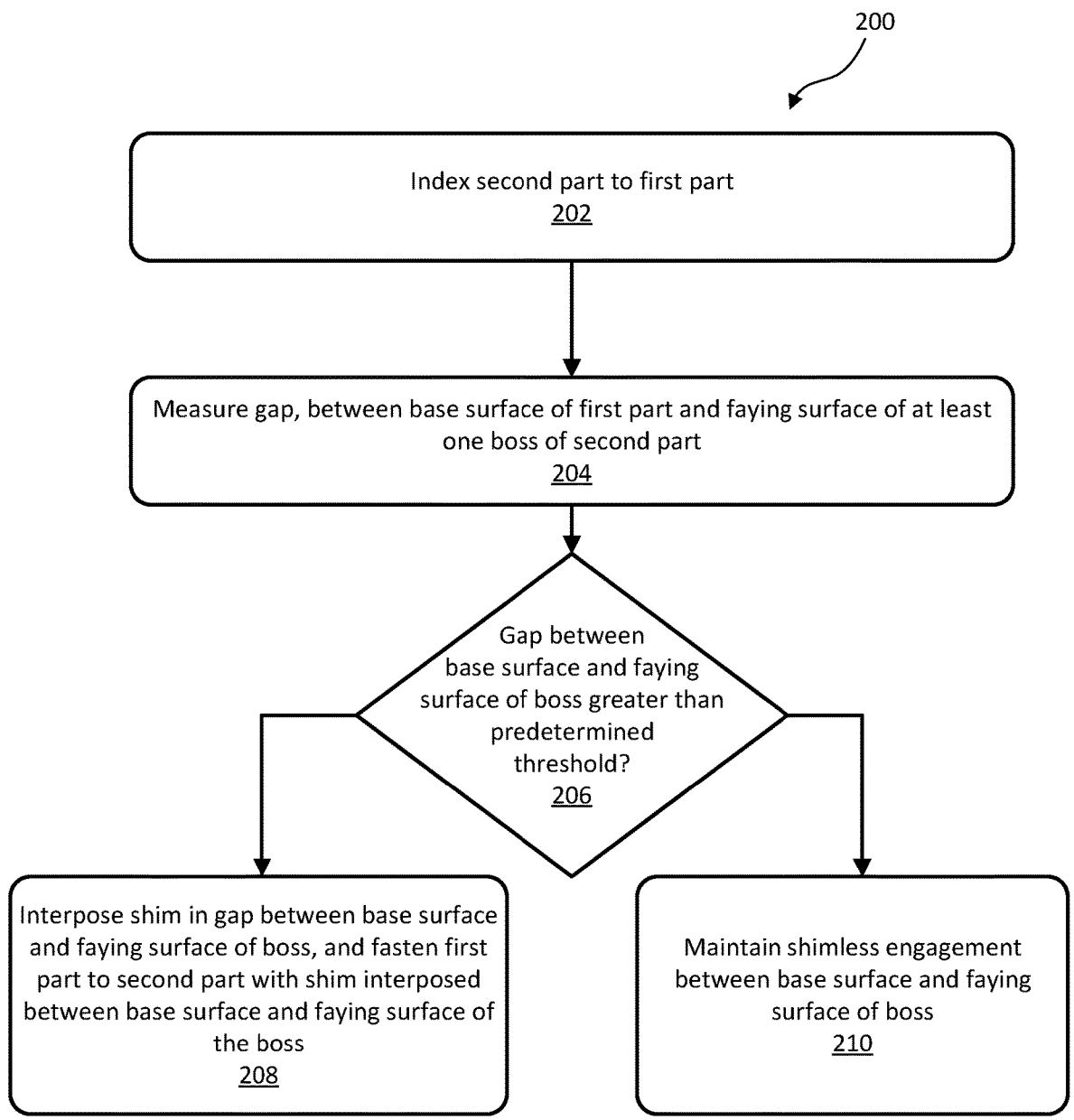
FIG. 9 is a schematic flow diagram of a method of making a joint assembly, according to one or more examples of the present disclosure.

Referring to FIG. 9, according to some examples, a method 200 of making the joint assembly 100, described above, includes (block 202) indexing the second part 110 to the first part 102. After the second part 110 is indexed to the first part 102 in block 202, the method 200 includes (block 204) measuring a gap, such as the gap G1 and/or the gap G2, between the base surface 120 and the faying surface 118 of at least one of the bosses 116. If it is determined at (block 206) that the gap G1 or the gap G2 is greater than a predetermined threshold, such as the predetermined maximum threshold, then the method 200 includes (block 208) interposing at least one shim 140 in the gap G1 or the gap G2 between the base surface 120 and the faying surface 118 of the at least one of the bosses 116, and fastening the first part 102 to the second part 110 with the at least one shim 140 in the gap G1 or the gap G2 between the base surface 120 and the faying surface 118 of the at last one of the bosses 116. However, if it is determined at (block 206) that the gap G1 or the gap G2 is not greater than the predetermined threshold (e.g., is less than or equal to the predetermined threshold), then the method 200 includes (block 210) maintaining a shimless engagement between the base surface 120 and the faying surface 118 of the at least one of the plurality of bosses 116.

In some examples, the method 200 further includes measuring only the gap between the base surface 120 and the faying surface 118 of at least one of the bosses, which means not measuring the second gap between the base surface 120 and the non-faying surface 112. Accordingly, before fastening the first part 102 to the second part 110, with the shim 140 in the gap at block 210 and no shim in the second gap between the base surface 120 and the non-faying surface 112, the second gap is not measured. Withholding measurement of the second gap, which is acceptable because shimming a non-faying surface is unnecessary, saves time, effort, and cost associated with shimming the joint assembly 100.

The method 200, in certain examples, further includes additional steps after performing the steps associated with block 208 or block 210. In one example, after performing the steps associated with block 208 or block 210, the method 200 includes drilling the through-holes (e.g., first through-hole 132 and second through-hole 114) in the parts (e.g., first part 102 and second part 110), inserting the fastener 122, torqueing (e.g., tightening) the fastener 122, pausing for a predetermined period of time, and re-torqueing the fastener 122.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An assembly, comprising:
   a first part, comprising a base surface and a plurality of first through-holes formed in the base surface and extending through the first part;
   a second part, attached directly to the base surface of the first part and comprising:
      a non-faying surface facing the base surface;
      a plurality of bosses, spaced apart from each other, each boss protruding from the non-faying surface, and each boss defining a faying surface engaged with a corresponding portion of the base surface of the first part; and
      a plurality of second through-holes, each one formed in the faying surface of a corresponding one of the plurality of bosses and each one co-axially aligned with a corresponding one of the plurality of first through-holes; and
   a plurality of fasteners, each fastener passing through a corresponding one of the plurality of first through-holes and the corresponding one of the plurality of second through-holes that is coaxially aligned with the corresponding one of the plurality of first through-holes;
   wherein:
      a width of each one of the plurality of bosses is equal to or greater than $2(r+T \tan \theta)$, where r is a maximum radial dimension of an outermost peripheral portion of the fastener, passing through the corresponding one of the plurality of second through-holes, in contact with the first part or the second part, T is a distance from a point of contact, between the outermost peripheral portion of the fastener and the first part or the second part, and the faying surface of the corresponding one of the plurality of bosses, and $\theta$ is an angle between a central axis of the corresponding second through-hole and an outermost load vector initiating at the point of contact between the outermost peripheral portion of the fastener and the first part or the second part;
      a total surface area of the faying surfaces of the plurality of bosses is no more than 18% of a total surface area of the non-faying surface;
      a height of each one of the plurality of bosses is inclusively between 0.025 inches and 0.035 inches;
      $\theta$ is at most 25-degrees; and
      a central axis of each one of the plurality of second through-holes passes through a geometric center of the corresponding one of the plurality of bosses.

2. The assembly according to claim 1, wherein a total surface area of the faying surfaces of the plurality of bosses is no more than 18% of a total surface area of the non-faying surface.

3. The assembly according to claim 1, wherein a total surface area of the faying surfaces of the plurality of bosses is no more than 7% of the total surface area of the non-faying surface.

4. The assembly according to claim 1, wherein a height of each one of the plurality of bosses is inclusively between 0.025 inches and 0.035 inches.

5. The assembly according to claim 4, wherein a maximum distance between the base surface of the first part and the non-faying surface of the second part is equal to the height of each one of the plurality of bosses.

6. The assembly according to claim 1, wherein:
   each one of the plurality of fasteners comprises a bolt and a nut;
   the bolt comprises a head and a shank extending from the head;
   the nut is engaged with the shank of the bolt to secure together the first part and the second part between the head of the bolt and the nut; and
   r is equal to the lesser one of the maximum radial dimension of the outermost peripheral portion of the head in contact with the first part or the second part or the maximum radial dimension of the outermost peripheral portion of the nut in contact with the first part or the second part.

7. The assembly according to claim 1, wherein $\theta$ is at most 25-degrees.

8. The assembly according to claim 7, wherein θ is at most 17-degrees.

9. The assembly according to claim 1, further comprising at least one shim, interposed between the base surface and the faying surface of at least one of the plurality of bosses.

10. The assembly according to claim 9, wherein:
a gap between the base surface and the faying surface of the at least one of the plurality of bosses is greater than 0.005 inches; and
a thickness of the at least one shim is substantially equal to the gap.

11. The assembly according to claim 9, wherein at least one shim is interposed between the base surface and the faying surface of more than one of the plurality of bosses.

12. The assembly according to claim 9, wherein no shim is interposed between the base surface of the first part and the non-faying surface of the second part.

13. The assembly according to claim 1, wherein a central axis of each one of the plurality of second through-holes passes through a geometric center of the corresponding one of the plurality of bosses.

14. The assembly according to claim 1, further comprising at least one shim, interposed between the base surface and the faying surface of at least one of the plurality of bosses, wherein:
the first part is made of a fiber-reinforced polymeric material; and
the second part is made of a metallic material.

15. The assembly according to claim 14, wherein the width of each one of the plurality of bosses is equal to $2(r+T \tan \theta)$.

16. The assembly according to claim 1, further comprising at least one shim, interposed between the base surface and the faying surface of at least one of the plurality of bosses.

17. An aircraft comprising:
a first part, comprising a base surface and a plurality of first through-holes formed in the base surface and extending through the first part;
a second part, attached directly to the base surface of the first part and comprising:
a non-faying surface facing the base surface;
a plurality of bosses, spaced apart from each other, each boss protruding from the non-faying surface, and each boss defining a faying surface engaged with a corresponding portion of the base surface of the first part; and
a plurality of second through-holes, each one formed in the faying surface of a corresponding one of the plurality of bosses and each one co-axially aligned with a corresponding one of the plurality of first through-holes;
a plurality of fasteners, each fastener passing through a corresponding one of the plurality of first through-holes and the corresponding one of the plurality of second through-holes that is coaxially aligned with the corresponding one of the plurality of first through-holes;
a skin panel comprising an internal surface and an external surface;
wherein:
a width of each one of the plurality of bosses is equal to or greater than $2(r+T \tan \theta)$, where r is a maximum radial dimension of an outermost peripheral portion of the fastener, passing through the corresponding one of the plurality of second through-holes, in contact with the first part or the second part, T is a distance from a point of contact, between the outermost peripheral portion of the fastener and the first part or the second part, and the faying surface of the corresponding one of the plurality of bosses, and θ is an angle between a central axis of the corresponding second through-hole and an outermost load vector initiating at the point of contact between the outermost peripheral portion of the fastener and the first part or the second part;
the aircraft comprises a skin panel; and
the first part is the skin panel of the aircraft.

18. The aircraft according to claim 17, wherein:
the aircraft comprises a wing;
the skin panel is a skin panel of the wing; and
the second part comprises an internal rib of the wing.

19. The aircraft according to claim 17, wherein:
the aircraft comprises a wing;
the skin panel is a skin panel of the wing; and
the second part comprises an external fitting of the wing.

20. The assembly according to claim 17, wherein:
a total surface area of the faying surfaces of the plurality of bosses is no more than 18% of a total surface area of the non-faying surface;
a height of each one of the plurality of bosses is inclusively between 0.025 inches and 0.035 inches;
θ is at most 25-degrees; and
a central axis of each one of the plurality of second through-holes passes through a geometric center of the corresponding one of the plurality of bosses.

21. A method of making an assembly, the method comprising:
indexing a second part to a first part, wherein:
the first part comprises a base surface and a plurality of first through-holes formed in the base surface and extending through the first part;
the second part comprises a non-faying surface facing the base surface, a plurality of bosses, spaced apart from each other, each boss protruding from the non-faying surface, and each boss defining a faying surface engaged with a corresponding portion of the base surface of the first part, and a plurality of second through-holes, each one formed in the faying surface of a corresponding one of the plurality of bosses and each one co-axially aligned with a corresponding one of the plurality of first through-holes;
a total surface area of the faying surfaces of the plurality of bosses is no more than 18% of a total surface area of the non-faying surface;
a height of each one of the plurality of bosses is inclusively between 0.025 inches and 0.035 inches;
θ is at most 25-degrees; and
a central axis of each one of the plurality of second through-holes passes through a geometric center of the corresponding one of the plurality of bosses
after the second part is indexed to the first part, measuring a gap between the base surface and the faying surface of at least one of the plurality of bosses;
if the gap is greater than a predetermined threshold, interposing at least one shim in the gap between the base surface and the faying surface of the at least one of the plurality of bosses, and fastening the first part to the second part with the at least one shim interposed between the base surface and the faying surface of the at least one of the plurality of bosses; and
if the gap is less than or equal to the predetermined threshold, maintaining a shimless engagement between the base surface and the faying surface of the at least one of the plurality of bosses, wherein:
each fastener of a plurality of fasteners passes through a corresponding one of the plurality of first through-holes and the corresponding one of the plurality of second through-holes that is coaxially aligned with the corresponding one of the plurality of first through-holes; and
wherein a width of each one of the plurality of bosses is equal to or greater than $2(r+T \tan \theta)$, where r is a maximum radial dimension of an outermost peripheral portion of the fastener, passing through the corresponding one of the plurality of second through-holes, in contact with the first part or the second part, T is a distance from a point of contact, between the outermost peripheral portion of the fastener and the first part or the second part, and the faying surface of the corresponding one of the plurality of bosses, and $\theta$ is an angle between a central axis of the corresponding second through-hole and an outermost load vector initiating at the point of contact between the outermost peripheral portion of the fastener and the first part or the second part.

22. The method according to claim 21, further comprising not measuring a second gap between the base surface and a non-faying surface of the second part.

\* \* \* \* \*

UNITED STATES PATENT AND TRADEMARK OFFICE
CERTIFICATE OF CORRECTION

PATENT NO. : 11,325,691 B2
APPLICATION NO. : 16/783725
DATED : May 10, 2022
INVENTOR(S) : Brett D. Whitmer It is certified that error appears in the above-identified patent and that said Letters Patent is hereby corrected as shown below:

On the Title Page

Item [57], Line 6:
"$2(r+T \tan \theta)$" should read "$2(r + Ttan\theta)$"

In the Specification

Column 1, Line 66:
"$2(r+T \tan \theta)$" should read "$2(r + Ttan\theta)$"

Column 3, Line 31:
"$2(r+T \tan \theta)$" should read "$2(r + Ttan\theta)$"

Column 4, Line 6:
"$2(r+T \tan \theta)$" should read "$2(r + Ttan\theta)$"

Column 11, Line 20:
"$2(r+T \tan \theta)$" should read "$2(r + Ttan\theta)$"

Column 11, Lines 45-46:
"minimum of $2(r1+T1 \tan \theta)$ or $2(r2+T2 \tan \theta)$" should read "minimum of $2(r1+T1tan\theta)$ or $2(r2+T2tan\theta)$"

Column 11, Line 53:
"$2(r+T \tan \theta)$" should read "$2(r + Ttan\theta)$"

In the Claims

Column 16, Line 13 Claim 1:
"$2(r+T \tan \theta)$" should read "$2(r + Ttan\theta)$"

Signed and Sealed this
Thirty-first Day of January, 2023

Katherine Kelly Vidal
*Director of the United States Patent and Trademark Office*

CERTIFICATE OF CORRECTION (continued)
U.S. Pat. No. 11,325,691 B2

Column 17, Lines 30-31 Claim 15:
"2(r+T tan θ)" should read "*2(r + Ttanθ)*"

Column 17, Line 62 Claim 17:
"2(r+T tan θ)" should read "*2(r + Ttanθ)*"

Column 19, Line 9 Claim 21:
"2(r+T tan θ)" should read "*2(r + Ttanθ)*"